UNITED STATES PATENT OFFICE.

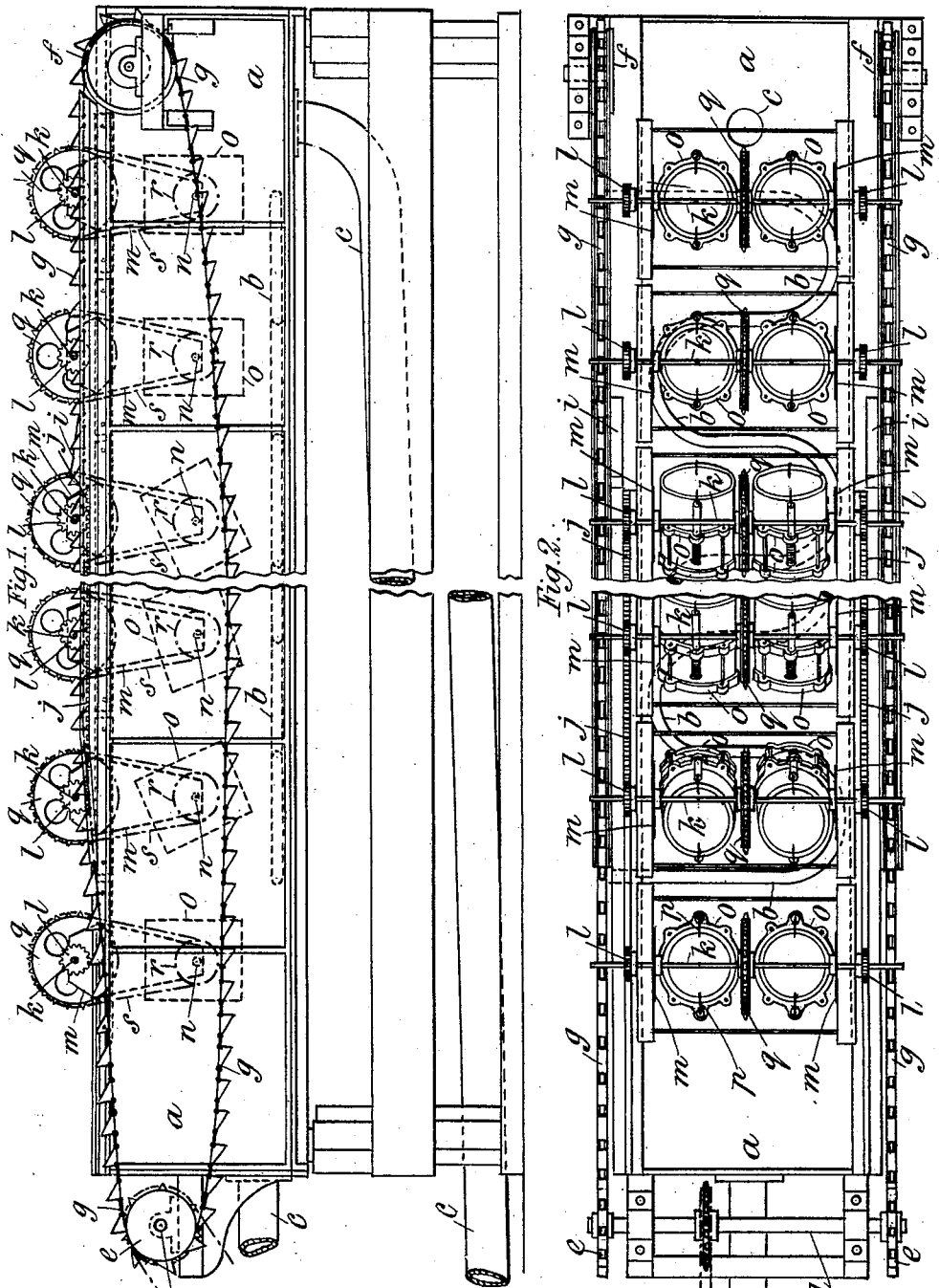

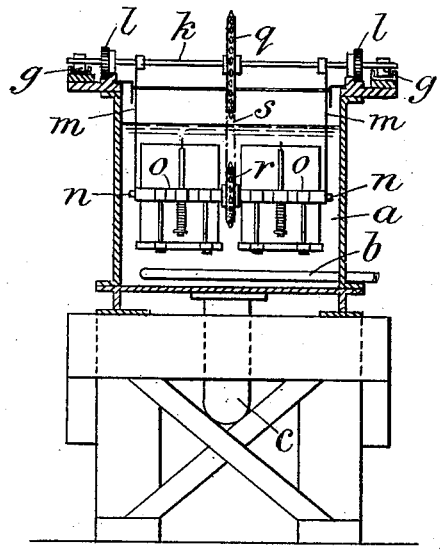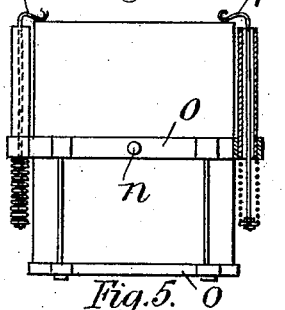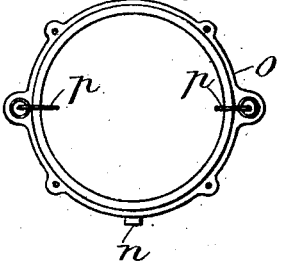

JOHN COLIN LIVINGTON CAMPBELL, OF BLAIRGOWRIE, SCOTLAND.

PROCESS OF TREATING FRUIT.

No. 909,542.　　　　Specification of Letters Patent.　　　Patented Jan. 12, 1909.

Application filed November 4, 1907. Serial No. 400,608.

*To all whom it may concern:*

Be it known that I, JOHN COLIN LIVINGTON CAMPBELL, late lieutenant-colonel Royal Engineers and brevet colonel, a subject of the King of Great Britain, residing at Achalader, Blairgowrie, Perthshire, North Britain, have invented new and useful Improvements in Processes of Treating Fruit, of which the following is a specification.

Fruit to be sterilized is usually put into tins which are placed in a bath heated to the proper temperature, for about two hours. I have discovered that if the tins containing the fruit are rotated preferably about a transverse axis, while being heated, the temperature in the center of the tin reaches the sterilizing point earlier, thus shortening the process and cooking the fruit on the outside less and allowing bigger tins to be used.

The drawings illustrate apparatus suitable for use in carrying out my invention.

Figure 1 is a side elevation, Fig. 2 a plan, and Fig. 3 a transverse section. Fig. 4 is a side elevation and Fig. 5 a plan of one of the frames to a larger scale.

*a* is a trough in which is a steam pipe *b* for increasing the temperature as required.

*c* are pipes through which water is supplied and returned to a boiler situated in any convenient position.

At one end of the trough *a* is a driven shaft *d* carrying two sprocket wheels *e e* and at the other end are two other sprocket wheels *f f* and endless conveyer chains *g g* pass over these sprocket wheels. At the end of the trough at which the carriages are inserted inclines *i i* are provided at each side of the trough and beyond the inclines *i i* racks *j j* extend along both sides of the trough.

In the trough are carriages, on each carriage is a shaft *k* having on it two toothed wheels *l l* which gear with the racks *j j*, each end of the shaft *k* being prolonged so as to engage with the teeth of the conveyer chains *g g*. Depending from this shaft are plates *m m* supporting the trunnions *n n* of the frames *o o* in which the vessels containing the fruit are held by means of spring catches *p p*. Fast to the shaft *k* and the frame *o* are sprocket wheels *q* and *r* connected together by a chain *s*.

The process may be carried out as follows:—The fruit is placed in the tins or vessels which are closed except for a small blow hole and the tins are placed in the frames *o* and secured therein by the spring catches *p p*. The carriages carrying the frames are placed in and traversed along the trough by means of the endless chains *g g* but the frames are not at first rotated as the racks *j j* do not extend the whole length of the trough. After the tins have been a few minutes in the trough the carriages come to rest being raised by the inclines *i i* out of contact with the chains and the frames are given one quick rotation by hand and the blow holes are soldered up. The carriages then proceed and as they have reached the racks *j j* the frames are kept in rotation. When the end of the trough is reached the carriages are removed and may with advantage be placed in a similar trough containing cold water or the tins may be removed and allowed to cool in the air.

In most cases I have found that the bath should be heated to a temperature of 180° to 195° F.

The apparatus herein shown and described is claimed in my application for Patent No. 421,215, filed March 14, 1908.

Having now particularly described and ascertained the nature of my said invention and in what manner the same is to be performed I declare that what I claim is:—

1. The process for treating fruit by heating the vessels containing the fruit in a bath, turning and then closing the vessels, and then repeatedly turning the vessels as they traverse the bath, substantially as described.

2. The process for treating fruit by heating the vessels containing the fruit in a bath, turning and then closing the vessels, and then repeatedly turning the vessels about their transverse axes as they traverse the bath substantially as described.

3. The process of treating fruit by heating the vessels containing the fruit in a bath, the vessels being provided with a small hole; rapidly turning the vessels; raising the vessels out of the bath and closing the hole in the vessels; and then repeatedly turning the vessels about their transverse axes as they traverse the bath.

JOHN COLIN LIVINGTON CAMPBELL.

Witnesses:
　GEORGE HUTTON,
　J. T. HUTTON.